(12) United States Patent
Kuroda

(10) Patent No.: US 7,705,898 B2
(45) Date of Patent: *Apr. 27, 2010

(54) SOLID-STATE IMAGING APPARATUS

(75) Inventor: Yukihiro Kuroda, Ebina (JP)

(73) Assignee: Olympus Corporation, Tokyo (JP)

( * ) Notice: Subject to any disclaimer, the term of this patent is extended or adjusted under 35 U.S.C. 154(b) by 533 days.

This patent is subject to a terminal disclaimer.

(21) Appl. No.: 11/633,634

(22) Filed: Dec. 5, 2006

(65) Prior Publication Data

US 2007/0126901 A1 Jun. 7, 2007

(30) Foreign Application Priority Data

Dec. 6, 2005 (JP) .............................. 2005-351461

(51) Int. Cl.
*H04N 5/335* (2006.01)
(52) U.S. Cl. ...................................... 348/296; 348/294
(58) Field of Classification Search ......... 348/294–324; 250/208.1–208.4

See application file for complete search history.

(56) References Cited

U.S. PATENT DOCUMENTS 6,798,451 B1 * 9/2004 Suzuki et al. ............... 348/294

6,999,120 B1 * 2/2006 Egawa et al. ............... 348/296
2005/0105836 A1 * 5/2005 Gomi et al. ................. 384/302

FOREIGN PATENT DOCUMENTS

JP 05-316431 11/1993
JP 06-350933 12/1994

* cited by examiner

*Primary Examiner*—Tuan Ho
*Assistant Examiner*—Don Nguyen
(74) *Attorney, Agent, or Firm*—Westerman, Hattori, Daniels & Adrian, LLP

(57) ABSTRACT

A solid-state imaging apparatus including: an electronic shutter scanning circuit for outputting to a pixel section a second line select signal for selecting second lines to which an operation setting corresponding to exposure time is effected; and a scanning control section for executing a first control for controlling selection of first lines through a read scanning circuit in a read region consisting of a plurality of lines within the pixel section and a second control for controlling selection of the second lines through the electronic shutter scanning circuit with taking the read region and an unread region in the vicinity of the read region as subject of selection and controlling timing for resetting the pixel cells belonging to the second liens in accordance with the exposure time.

9 Claims, 14 Drawing Sheets

SOLID-STATE IMAGING APPARATUS

This application claims benefit of Japanese Patent Application No. 2005-351461 filed in Japan on Dec. 6, 2005, the contents of which are incorporated by this reference.

BACKGROUND OF THE INVENTION

The present invention relates to solid-state imaging apparatus, and more particularly relates to solid-state imaging apparatus having function for reading an optional region and having an electronic shutter function.

Various techniques have been proposed concerning solid-state imaging apparatus having an electronic shutter function. Japanese Patent Application Laid-Open hei-5-316431, for example, discloses a solid-state imaging apparatus where an electronic shutter function is achieved by providing a vertical scanning circuit for scanning rows to be read of a pixel section, and an electronic shutter scanning circuit for determining the timing of exposure operation where light is caused to be incident on each pixel.

The construction of a solid-state imaging apparatus having a known electronic shutter function will now be described by way of a block diagram shown in FIG. 1. The shown solid-state imaging apparatus includes: a pixel section 11 having a plurality of pixel cells PIX11 to PIX88 disposed in a matrix (showing only the sixty-four pixel cells PIX11 to PIX88 for ease of explanation); a vertical scanning circuit 12 for use in selecting rows to be read out of the pixel section 11; an electronic shutter scanning circuit 13 for use in determining start of exposure; a multiplexer 14 for providing to the pixel section 11 an output of one or the other of the vertical scanning circuit 12 and the electronic shutter scanning circuit 13; a noise suppressing circuit 15 for suppressing noise contained in the signals read out to vertical signal line V1 to V8 of each column; a horizontal scanning circuit 16 for fetching signals from the noise suppressing circuit 15 by selectively turning ON/OFF horizontal select switches M1 to M8; and an output amplifier 17 for amplifying the fetched signals.

Also referring to FIG. 1, symbols are respectively used to denote: read row select lines $\phi V1$ to $\phi V8$; electronic shutter row select lines $\phi VE1$ to $\phi VE8$; pixel reset pulse line of each row $\phi RST1$ to $\phi RST8$; pixel transfer pulse line of each row $\phi TR1$ to $\phi TR8$; vertical signal line of each column V1 to V8; column select lines $\phi H1$ to $\phi H8$; and a sensor output line OUT.

An operation of the solid-state imaging apparatus shown in FIG. 1 will now be described by way of a timing chart shown in FIG. 2. The timing chart of FIG. 2 is to show the waveforms of: VD (vertical synchronizing signal); $\phi V1$ to $\phi V8$ (read row select line), $\phi VE1$ to $\phi VE8$ (electronic shutter row select line), $\phi RST1$ to $\phi RST8$ (pixel reset pulse line of each row), and $\phi TR1$ to $\phi TR8$ (pixel transfer pulse line of each row). Further PD11 and PD12 represent electric potentials of photodiodes (not shown) of the pixel cells PIX11 and PIX12 in FIG. 1, respectively.

When an electronic shutter row select line $\phi VE1$ is driven to "H" level by the electronic shutter scanning circuit 13 at a timing point $t_1$, the electronic shutter row select line $\phi VE1$ is brought into its selected state. The pixel reset pulse line $\phi RST1$ is then driven to "H" level by the multiplexer 14 to set pixel cell PIX11 to a predetermined voltage value. Subsequently, when pixel transfer pulse line $\phi TR1$ is driven to "H" level at time $t_2$, the photodiode of pixel cell PIX11 discharges an electric charge so that electric potential PD11 of the photodiode is reset. The pixel transfer pulse line $\phi TR1$ is then driven to "L" level at time $t_2'$. Next, read row select line $\phi V1$ is selected by the vertical scanning circuit 12 at time $t_4$, and after that, at time $t_5$, the pixel transfer pulse line $\phi TR1$ is driven to "H" level again by the multiplexer 14. The time period from time $t_2'$ to time $t_5$ until the transfer of the pixel signal of pixel cell PIX11 becomes an exposure time of the pixel cell PIX11. Since sequential scanning is effected of the electronic shutter scanning circuit 13 and the vertical scanning circuit 12, the time period from time $t_3'$ to time $t_6$ similarly becomes an exposure time of the pixel cell PIX12 as shown in FIG. 2.

An electronic shutter function is achieved in this manner by providing a vertical scanning circuit for scanning rows to be read of the pixel section and an electronic shutter scanning circuit for determining the timing of exposure operation where light is caused to be incident on each pixel.

Further, various techniques have been proposed concerning solid-state imaging apparatus that are capable of reading pixel signals at high rates. For example, Japanese Patent Application Laid-Open hei-6-350933 discloses a solid-state imaging apparatus having a scanning circuit capable of scanning an optional region where scanning is started from an optional location and the scanning can be stopped at an optional location. By using a scanning circuit capable of optional region scanning as the vertical scanning circuit 12 and the electronic shutter scanning circuit 13 of the solid-state imaging apparatus shown in FIG. 1, an optional region of the pixel section 11 can be read out. It may be used for example in a mode where signals of all pixels are read out in taking a high-definition still image while, on the other hand, signals are read out at high speed by windowing an optional region in providing dynamic image outputs.

SUMMARY OF THE INVENTION

In a first aspect of the invention, there is provided a solid-state imaging apparatus including: a pixel section having a plurality of two-dimensionally disposed pixel cells each for effecting photoelectric conversion of an incident light, accumulating it as an electric charge, and converting it into an electrical signal; a plurality of lines each connected in common to a number of pixel cells arranged in a row direction of the pixel section; a read scanning circuit for outputting to the pixel section a first line select signal for selecting first lines from which the electrical signals are read out; an electronic shutter scanning circuit for outputting to the pixel section a second line select signal for selecting second lines to which an operation setting corresponding to exposure time is effected; and a scanning control section for executing a first control for controlling selection of the first lines through the read scanning circuit in a read region consisting of a plurality of lines within the pixel section and a second control for controlling selection of the second lines through the electronic shutter scanning circuit with taking the read region and an unread region in the vicinity of the read region as subject of selection and controlling timing for resetting the pixel cells belonging to the second lines in accordance with the exposure time.

The first to third embodiments correspond to an embodiment of the solid-state imaging apparatus according to the first aspect.

In a second aspect of the invention, the read scanning circuit in the solid-state imaging apparatus according to the first aspect includes many stages of first shift register units connected in cascade, each first shift register unit having a first subunit for transmitting output signal from the first shift register unit of a previous stage to the first shift register unit of a next stage and outputting the first line select signal based on output signal from the first shift register unit of the previous stage, and a first storage section for storing output signal of the first subunit and outputting it to the first subunit. The electronic shutter scanning circuit includes many stages of second shift register units connected in cascade, each second shift register unit having a second subunit for transmitting output signal from the second shift register unit of a previous stage to the second shift register unit of a next stage and outputting the second line select signal based on output signal from the second shift register unit of the previous stage, and a second storage section for storing output signal of the second subunit and outputting it to the second subunit. The scanning control section under the first control causes the first storage section to store output signal of the first subunit corresponding to a start line of the read region and sets the stored output signal to the first subunit when starting read, and also causes to stop transmission of output signal from the first subunit corresponding to an end line of the read region to the first subunit of the next stage, while under the second control causes the second storage section to store output signal of the second subunit corresponding to a start line in the unread region and sets the stored output signal to the second subunit in accordance with the exposure time.

The first to third embodiments correspond to an embodiment of the solid-state imaging apparatus according to the second aspect.

In a third aspect of the invention, the scanning control section in the solid-state imaging apparatus according to the second aspect causes to stop transmission of output signal from the second subunit corresponding to an end line of the unread region to the second subunit of the next stage.

The second embodiment corresponds to an embodiment of the solid-state imaging apparatus according to the third aspect.

In a fourth aspect of the invention, the scanning control section in the solid-state imaging apparatus according to the second aspect under the second control controls the electronic shutter scanning circuit so that the electronic shutter scanning circuit outputs the second line select signal simultaneously to a plurality of the lines within the unread region in the vicinity of the read region.

The second and third embodiments correspond to an embodiment of the solid-state imaging apparatus according to the fourth aspect.

In a fifth aspect of the invention, the scanning control section in the solid-state imaging apparatus according to the second aspect under the second control controls the electronic shutter scanning circuit so that the electronic shutter scanning circuit outputs the second line select signal simultaneously to one line within the read region and to at least one line within the unread region.

The third embodiment corresponds to an embodiment of the solid-state imaging apparatus according to the fifth aspect.

In a sixth aspect of the invention, the solid-state imaging apparatus according to the first aspect further includes a mode switching section for switching based on input from an external section to set a first mode where the electrical signals are acquired from the entire region of an effective pixel region of the pixel section or a second mode where the read region having an optional size is set within the effective pixel region to acquire the electrical signals from the entire region within the read region. The scanning control section controls the read scanning circuit and the electronic shutter scanning circuit in accordance with a mode set by the mode switching section.

The first to third embodiments correspond to an embodiment of the solid-state imaging apparatus according to the sixth aspect.

In a seventh aspect of the invention, the scanning control section in the solid-state imaging apparatus according to the sixth aspect executes the second control when the second mode is set.

The first to third embodiments correspond to an embodiment of the solid-state imaging apparatus according to the seventh aspect.

In an eighth aspect of the invention, the scanning control section in the solid-state imaging apparatus according to the seventh aspect under the second control controls the electronic shutter scanning circuit so that the electronic shutter scanning circuit outputs the second line select signal simultaneously to a plurality of the lines within the unread region in the vicinity of the read region.

The second and third embodiments correspond to an embodiment of the solid-state imaging apparatus according to the eighth aspect.

In a ninth aspect of the invention, the scanning control section in the solid-state imaging apparatus according to the seventh aspect under the second control controls the electronic shutter scanning circuit so that the electronic shutter scanning circuit outputs the second line select signal simultaneously to one line within the read region and to at least one line within the unread region.

The third embodiment corresponds to an embodiment of the solid-state imaging apparatus according to the ninth aspect.

DESCRIPTION OF THE PREFERRED EMBODIMENTS

First Embodiment

Figure 3:
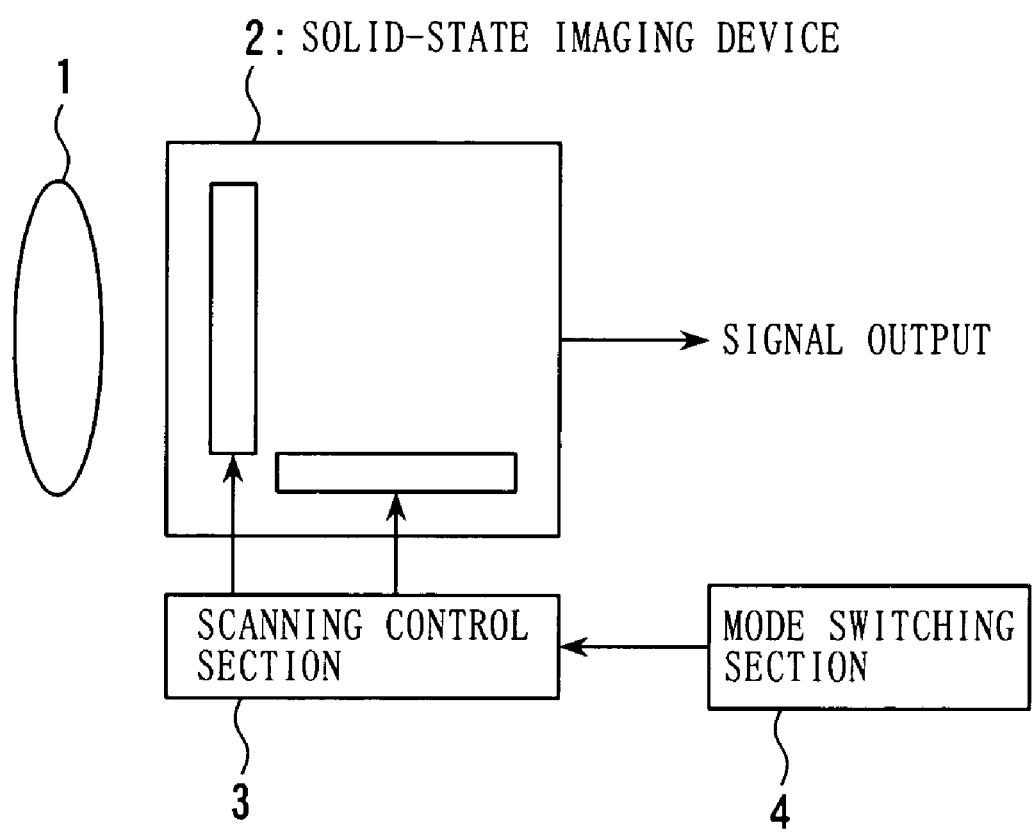
FIG. 3 is a block diagram showing fundamental construction of a first embodiment of the solid-state imaging apparatus according to the invention.

Some embodiments of the invention will be described below with reference to the drawings. A first embodiment of the solid-state imaging apparatus according to the invention will now be described. FIG. 3 is a block diagram schematically showing fundamental construction of the solid-state imaging apparatus according to the first embodiment. As shown in FIG. 3, the solid-state imaging apparatus according to this embodiment includes: a taking lens 1 constituting a part of the taking optical system for transmitting a light flux from an object to form a predetermined object image and cause it to be formed into an image on a predetermined imaging plane; a solid-state imaging device 2 having an imaging plane consisting of a plurality of pixel cells, for receiving an object image formed on the imaging plane as having been transmitted through the taking lens 1 to effect photoelectric conversion thereof and for outputting resulting electrical signals; a scanning control section 3 for controlling scanning of each scanning circuit of the solid-state imaging device 2; and a mode switching section 4 for switching based on input from an external section between modes for acquiring electrical signals from the pixel cells.

Figure 11:
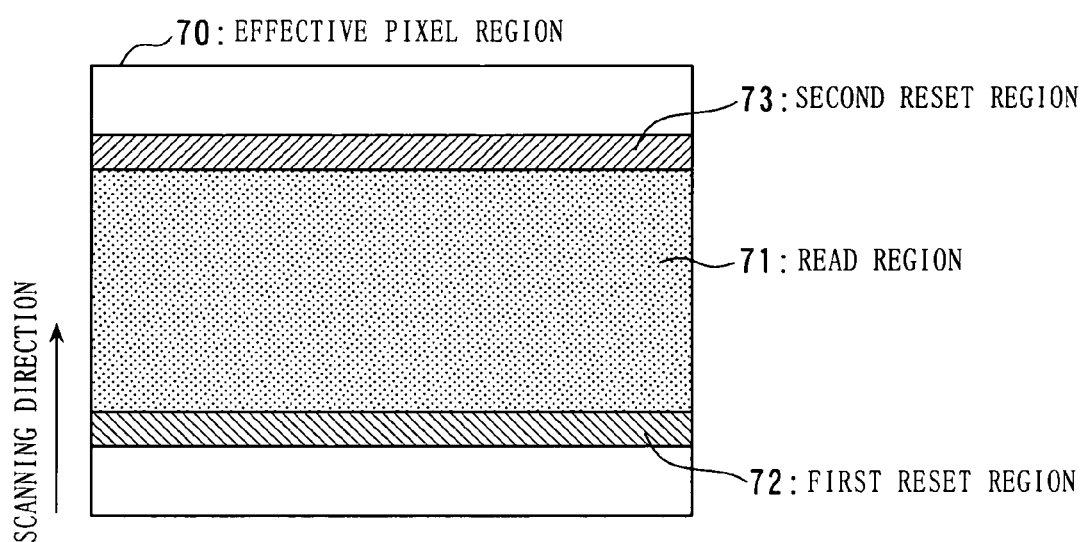
FIG. 11 typically shows each pixel region in the pixel section when an optional region is read out of the imaging device shown in FIG. 4.

It should be noted that the solid-state imaging apparatus according to the present embodiment has, as the above described modes of acquisition, a first mode where electrical signals of the pixel cells are acquired from the entire area of an effective pixel region 70 shown in FIG. 11, and a second mode where a read region 71 having an optional size shown in the same figure is set within the effective pixel region 70 and electrical signals of the pixel cells are acquired from the entire area within such region 71. In the following, the second mode is set wherever operation at the time of reading an optional region is explained.

Figure 1:
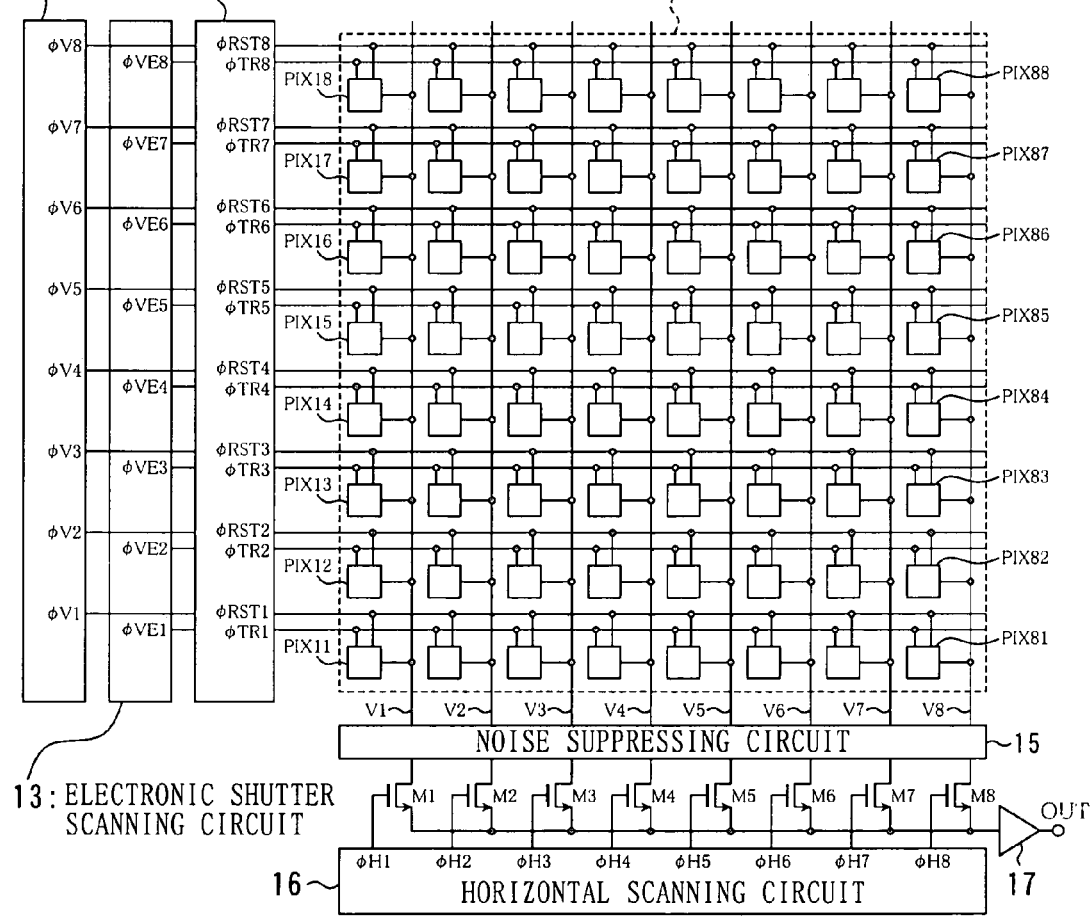
FIG. 1 is a block diagram showing an example of construction of a prior-art solid-state imaging apparatus having an electronic shutter function.
Figure 2:
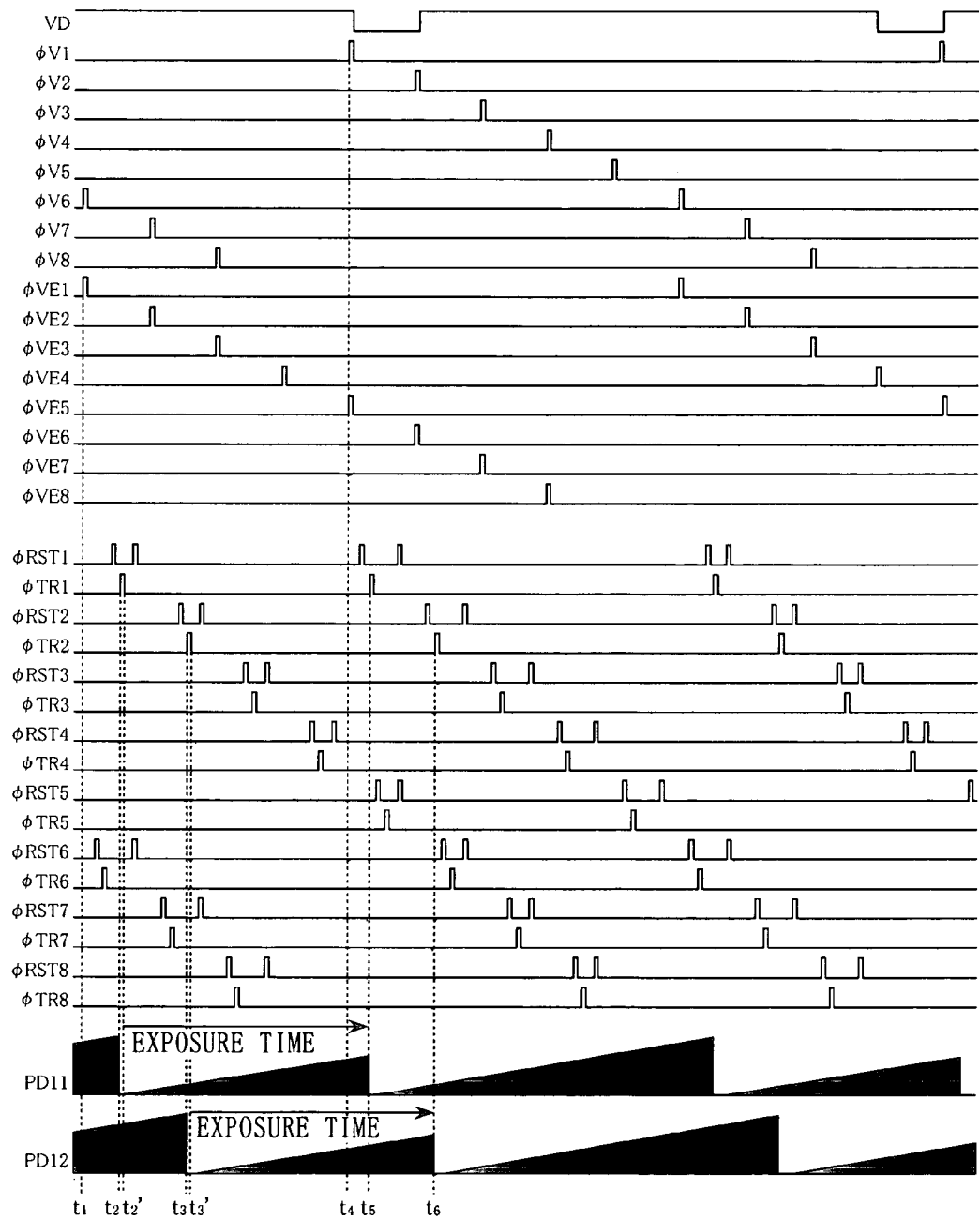
FIG. 2 is a timing chart for explaining operation in the solid-state imaging apparatus shown in FIG. 1.
Figure 4:
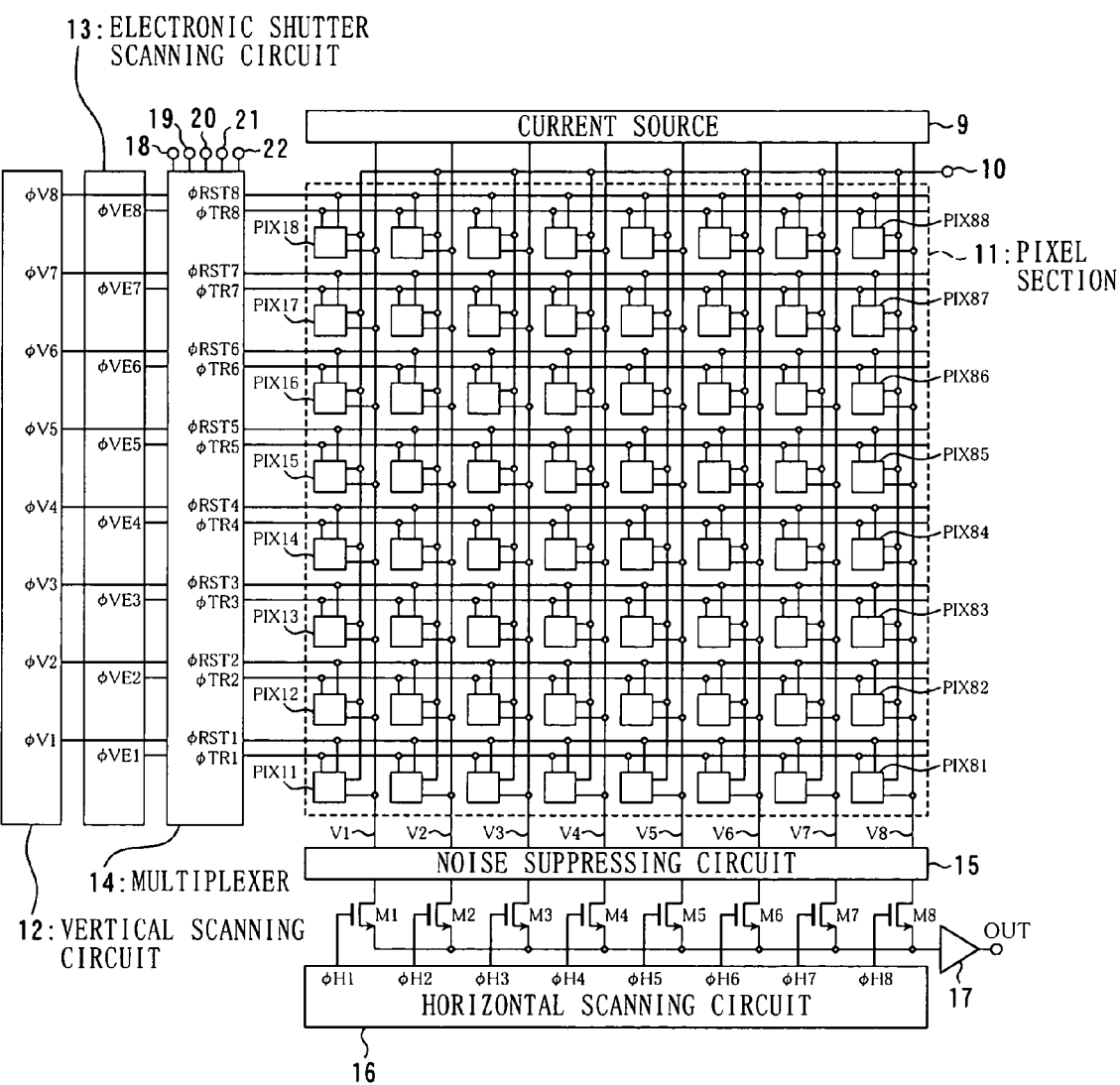
FIG. 4 is a block diagram showing construction of an imaging device of the solid-state imaging apparatus according to the embodiment shown in FIG. 3.

FIG. 4 is a block diagram schematically showing the solid-state imaging device 2 of FIG. 3, where like or corresponding components as in the prior-art example shown in FIG. 1 are denoted by like reference numerals. This solid-state imaging device includes: a pixel section 11 having a plurality of pixel cells PIX11 to PIX88 disposed in a matrix (showing only 64 pixel cells PIX11 to PIX88 for ease of explanation); an electric current source 9 for supplying electric current to the pixel section 11; a vertical scanning circuit 12 for use in selecting rows to be read of the pixel section 11; an electronic shutter scanning circuit 13 for use in determining start of exposure; a multiplexer 14 for outputting to the pixel section 11 a select line output of one or the other of the vertical scanning circuit 12 and the electronic shutter scanning circuit 13; a noise suppressing circuit 15 for suppressing noise contained in the signals read out to vertical signal lines V1 to V8 of each column; a horizontal scanning circuit 16 for fetching signals from the noise suppressing circuit 15 by selectively turning ON/OFF horizontal select switches M1 to M8; and an output amplifier 17 for amplifying the fetched signals.

Also referring to FIG. 4, numerals are used to denote: 10, power supply line for pixel cells (VDDCEL); 18, read reset pulse line (RST); 19, read transfer pulse line (TR); 20, electronic shutter reset pulse line (ERST); 21, electronic shutter transfer pulse line (ETR); 22, pulse line (VDRRS) for fetching outputs of the vertical scanning circuit 12 and the electronic shutter scanning circuit 13; read row select lines φV1 to φV8; electronic shutter row select lines φVE1 to φVE8; pixel reset pulse line φRST1 to φRST8 of each row; pixel transfer pulse line φTR1 to φTR8 of each row; vertical signal line V1 to V8 of each column; column select lines φH1 to φH8; and a sensor output line OUT.

The vertical scanning circuit 12, electronic shutter scanning circuit 13, multiplexer 14, and horizontal scanning circuit 16 are connected to the scanning control section 3 shown in FIG. 3, and are controlled by control signals generated at the scanning control section 3 in accordance with signals from the mode switching section 4 which is connected to the scanning control section 3.

Figure 5:
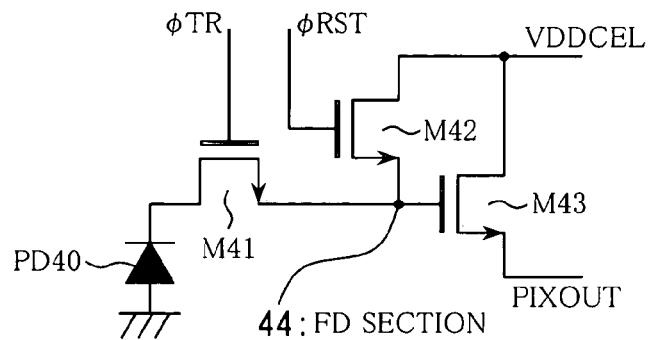
FIG. 5 is a circuit diagram showing an example of construction of a pixel cell in the imaging device shown in FIG. 4.

FIG. 5 is a circuit diagram showing an example of actual construction of each pixel cell PIX11 to PIX88 in the solid-state imaging device shown in FIG. 4. This pixel cell includes: a photodiode PD40 for converting incident light into an electrical signal; a transfer transistor M41; a reset transistor M42; and a pixel amplification transistor M43. Symbols used in the figure are: φRST for the pixel reset pulse line; φTR for the pixel transfer pulse line; VDDCEL for the power supply line of pixel cell; and PIXOUT for the pixel output line. Numeral 44 denotes a floating diffusion (hereinafter referred to as FD) section.

Figure 6:
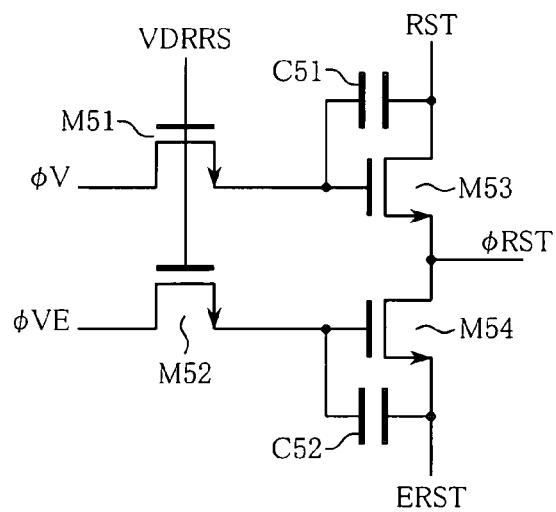
FIG. 6 is a circuit diagram showing construction of a pixel reset pulse output circuit of the multiplexer in the imaging device shown in FIG. 4.
Figure 7:
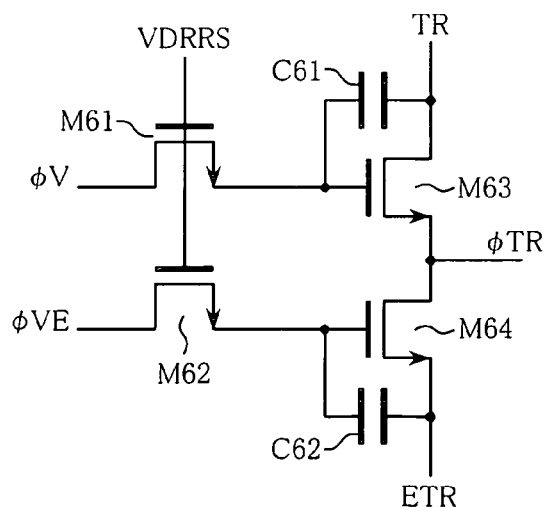
FIG. 7 is a circuit diagram showing construction of a pixel transfer pulse output circuit of the multiplexer in the imaging device shown in FIG. 4.

FIGS. 6 and 7 are circuit diagrams for showing an example of actual construction of the multiplexer 14 in the solid-state imaging apparatus shown in FIG. 4, where the multiplexer 14 is formed of a pair consisting of a pixel reset pulse output circuit shown in FIG. 6 and a pixel transfer pulse output circuit shown in FIG. 7 of an identical construction. In actual construction of the multiplexer, a number of pairs having such construction are provided corresponding to the number of rows in the pixel section. In FIGS. 6 and 7 are: M51, M61, output fetching transistor of the vertical scanning circuit 12; M52, M62, output fetching transistor of the electronic shutter scanning circuit 13; M53, read reset pulse output transistor; M54, electronic shutter reset pulse output transistor; M63, read transfer pulse output transistor; M64, electronic shutter transfer pulse output transistor; and capacitors C51, C52, and C61, C62. Also there are: RST for read reset pulse line; ERST for electronic shutter reset pulse line; TR for read transfer pulse line; ETR for electronic shutter transfer pulse line; VDRRS for scanning circuit output fetching pulse line; φV for read row select line; φVE for electronic shutter row select line; φRST for pixel reset pulse line; and φTR for pixel transfer pulse line.

A reset operation and read operation of the pixel cell shown in FIG. 5 will be described in the following. The reset operation of the pixel cell will now be described. When the power supply line (VDDCEL) 10 of pixel cell is set to "H" level, an electric current is supplied to the pixel cell from the current source 9 to start an operation mode. When the reset transistor M42 is turned ON by the pixel reset pulse line φRST, FD section 44 is set to the same "H" level as the power supply line VDDCEL. Next, after turning OFF the reset transistor M42 by the pixel reset pulse line φRST, when the transfer transistor M41 is turned ON by the pixel transfer pulse line φTR, the electric charge accumulated at photodiode PD40 is transferred to FD section 44 through the transfer transistor M41. The electric charge at photodiode PD40 is thereby cleared to effect reset operation of the pixel cell. Subsequently, the transfer transistor M41 is turned OFF by the pixel transfer pulse line φTR so as to bring photodiode PD40 into its charge accumulating state to end reset operation of the pixel cell.

Further, after setting the power supply line VDDCEL to "L" level, when the reset transistor M42 is turned ON by the pixel reset pulse line φRST, FD section 44 is set to the same "L" level as the power supply line VDDCEL. Next, the reset transistor M42 is turned OFF by the pixel reset pulse line φRST to retain "L" level at FD section 44, thereby the pixel cell is brought into non-operation state. Light being incident in this condition is accumulated at photodiode PD40 as an electrical signal.

The read operation of the pixel cell will now be described. First the power supply line VDDCEL is set to "H" level. Next, the reset transistor M42 is turned ON by the pixel reset pulse line φRST to set FD section 44 to the same "H" level as the power supply line VDDCEL. Next, after turning OFF the reset transistor M42 by the pixel reset pulse line φRST, the transfer transistor M41 is turned ON by the pixel transfer pulse line φTR. The electric charge accumulated at photodiode PD40 is thereby transferred to FD section 44. Subsequently, the transfer transistor M41 is turned OFF by the pixel transfer pulse line φTR to end the transfer.

The electric charge at FD section 44 is outputted as voltage to the output line PIXOUT of the pixel through the pixel amplification transistor M43. Next, the power supply line VDDCEL is set to "L" level, and the reset transistor M42 is turned ON by the pixel reset pulse line φRST. FD section 44 is thereby set to the same "L" level as the power supply line VDDCEL. Subsequently, the reset transistor M42 is turned OFF by the pixel reset pulse line φRST to keep FD section 44 to "L" level. At this point, signal readout from the pixel cell is complete.

An operation will now be described of the multiplexer 14 which is formed of the pixel reset pulse output circuit and the pixel transfer pulse output circuit shown in FIG. 6 and FIG. 7. As described above, the pixel reset pulse output circuit and the pixel transfer pulse output circuit respectively shown in FIGS. 6 and 7 are of an identical construction with each other, and their operation is substantially the same. For this reason, only the operation of the pixel reset pulse output circuit shown in FIG. 6 will be described below. In the condition where the read reset pulse line RST is kept to "L" level, for example when the inputted level of the read row select line φV is "H" level, signal at "H" level of the read row select line φV is accumulated at capacitor C51 if the output fetching transistor M51 is turned ON by the scanning circuit output fetching pulse line VDRRS. Even after the turning OFF of the output fetching transistor M51 by the scanning circuit output fetching pulse line VDRRS, the signal level accumulated at capacitor C51 is retained. Here, when the read reset pulse line RST is driven to "H" level, "H" level is outputted to the pixel reset pulse line φRST.

On the other hand, when the read row select line φV is "L" level, signal at "L" level is accumulated at capacitor C51. In this case, since the read reset pulse output transistor M53 is OFF, the read reset pulse RST irrespective of its signal level is not outputted onto the pixel reset pulse line φRST. While the above has been an explanation concerning the read row select line φV, one concerning the electronic shutter row select line φVE is similar. In this manner, pulse is outputted onto the pixel reset pulse line φRST in accordance with the level of the read reset pulse line RST or the electronic shutter reset pulse line ERST only when the read row select line φV/electronic shutter row select line φVE is "H" level. Accordingly, the pixel reset pulse line φRST and the pixel transfer pulse line φTR are driven in accordance with the output of the respective scanning circuit 12, 13 and operation of the multiplexer 14, thereby the above described reset operation and read operation of pixel cell are performed.

Figure 8:
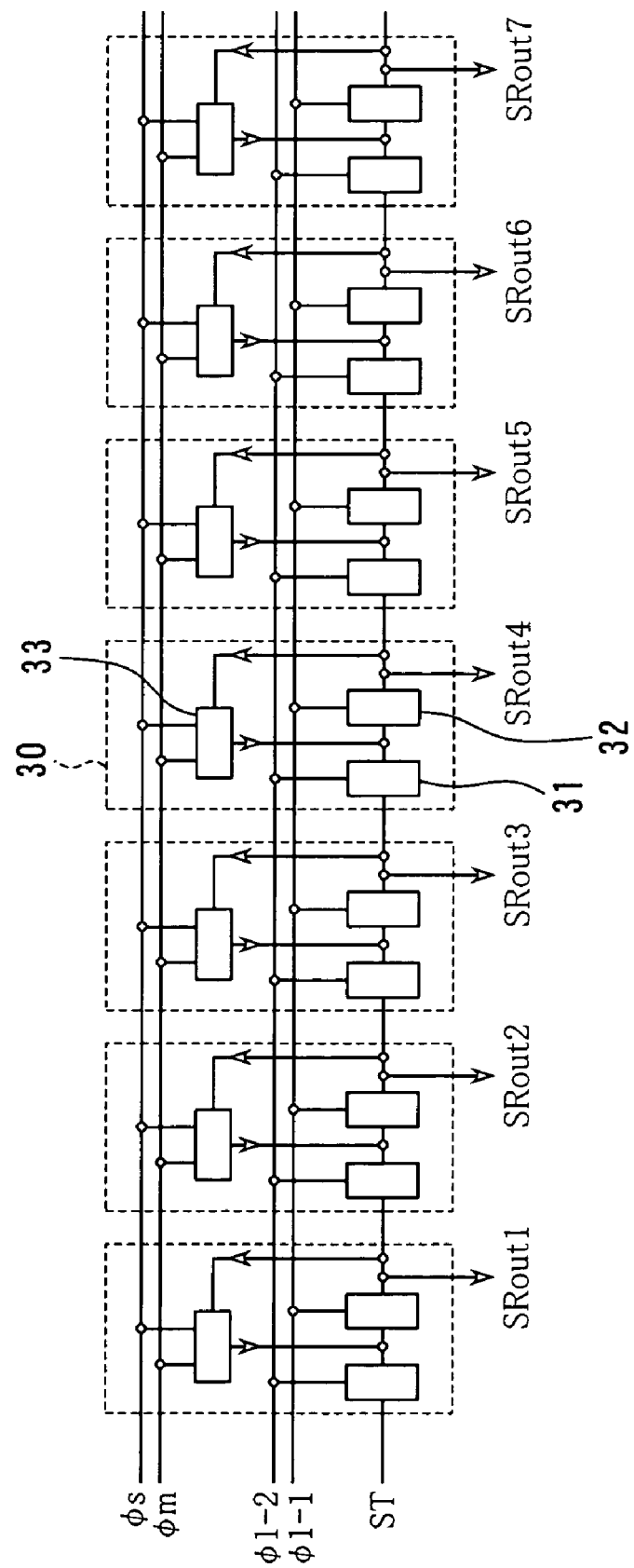
FIG. 8 is a block diagram showing an example of fundamental construction of the shift register to be used in an electronic shutter scanning circuit in the imaging device shown in FIG. 4.

FIG. 8 is a block diagram showing an example of fundamental construction of the shift register for use in the vertical scanning circuit 12 and the electronic shutter scanning circuit 13. Referring to FIG. 8, a shift register unit 30 corresponding to one stage is composed of a first and second subunits 31 and 32 and a storage section 33. An output end of the shift register unit 30 is connected to an input end of the storage section 33, and is connected to an input end of the shift register unit 30 of the next stage. Further an output end of the storage section 33 is connected to an input end of the second subunit 32. The first and second subunits 31, 32 are driven by drive pulses φ1-2, φ1-1, respectively, and the storage section 33 has a function for effecting signal storage by control pulse φm and signal readout by control pulse φs.

It is to be noted that, in the following description, numerals in parenthesis are used so that each shift register unit, each subunit, and each storage section are distinguished from the others as to which one of the stages in order the shift register unit, subunit or storage section respectively belongs to. For example, those belonging to the first stage will be indicated as "shift register unit 30(1), first and second subunits 31(1), 32(1) storage section 33(1)".

A description will now be given by way of a timing chart shown in FIG. 9 of an operation in the case where sequential scan is effected of the shift register shown in FIG. 8. Referring to FIG. 8, upon an application of input signal ST to the first-stage shift register unit 30(1) at time $t_0$, when drive pulse φ1-2 is concurrently at "H" level, signal is transmitted from the first subunit 31(1) of the shift register unit 30(1) to the second subunit 32(1). At following time $t_1$, when drive pulse φ1-1 is "H" level, signal is transmitted to the shift register unit 30(2) of the next stage by the second subunit 32(1), and at the same time output SRout1 of the first-stage shift register unit 30(1) becomes "H" level. Thereafter, signal is sequentially transmitted in a similar manner at timings where drive pulses φ1-2 and φ1-1 become "H" level ($t_2$, $t_3$, etc.). Further, during such operation, control pulses φm and φs remain "L" level, and the storage section 33 does not operate. Accordingly, sequential scanning is effected as signals are outputted from the shift register in order of SRout1, SRout2, SRout3, etc.

Figure 10:
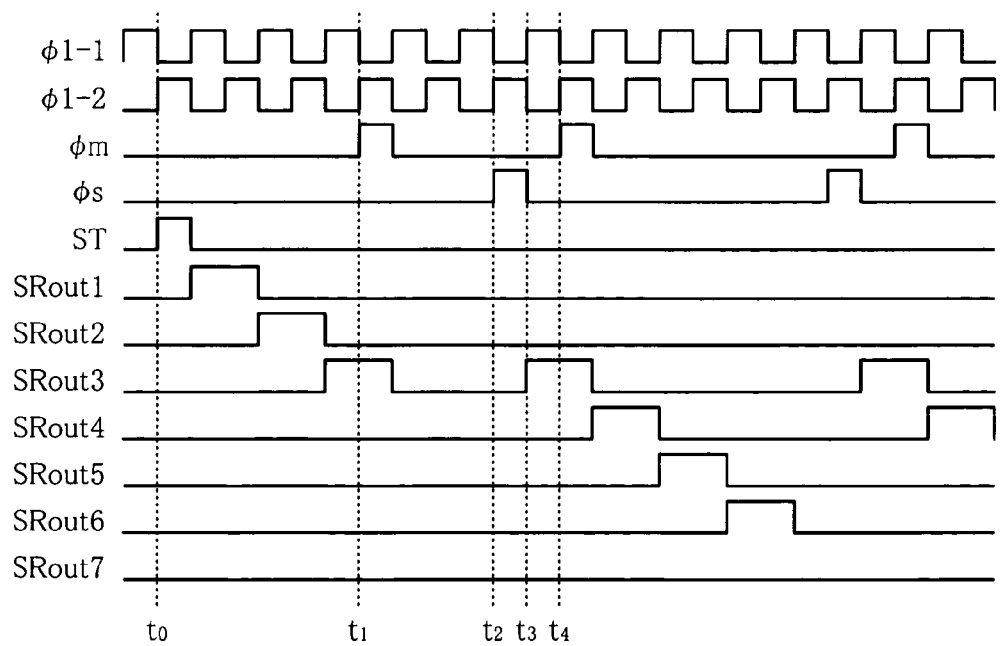
FIG. 10 is a timing chart for explaining operation in the case where windowing scanning is effected by the shift register shown in FIG. 8.

A description will now be given by way of a timing chart shown in FIG. 10 of an operation in the case where the shift register shown in FIG. 8 effects scanning with windowing an optional region of the pixel section 11. Referring to FIG. 10, upon an application of input signal ST to the first-stage shift register unit 30(1) at time $t_0$, the input signal is sequentially transmitted to effect sequential scanning as previously described at timings where drive pulses φ1-2 and φ1-1 become "H" level. When control pulse φm becomes "H" level at time $t_1$, each output level of the shift register unit is stored to each storage section 33. Since in this case output SRout3 of the third-stage shift register unit 30(3) is "H" level, "H" level is stored only to the storage section 33(3) of the third-stage shift register unit 30(3) and "L" level is stored to the storage section 33 of the other shift register units 30.

Next at time $t_2$, control pulse φs becomes "H" level so that the stored and retained signal level is read out from each storage section 33. At this time, since "H" level is retained at the storage section 33(3) of the third-stage shift register unit 30(3), the input end of the second subunit 32(3) of the third-stage shift register unit 30(3) becomes "H" level. Further, when drive pulse φ1-1 becomes "H" level at time $t_3$, signal is transmitted to the next stage, i.e., to the fourth-stage shift register unit 30(4) by the third-stage second subunit 32(3), and at the same time, the output SRout3 of the third-stage shift register unit 30(3) becomes "H" level. At following time $t_4$, signal is transmitted from the fourth-stage first subunit 31(4) to the second subunit 32(4) when drive pulse φ1-2 is "H" level, and at the same time when control pulse φm is "H" level, "H" level of output SRout3 of the third stage is stored again to the storage section 33(3) of the third stage. Thereafter, signal is sequentially transmitted at timings where drive pulses φ1-1, φ1-2 become "H" level, whereby the shift register performs sequential scanning started from the third stage. In this manner, scanning can be started from an optional location based on control by control pulses φm, φs.

Figure 9:
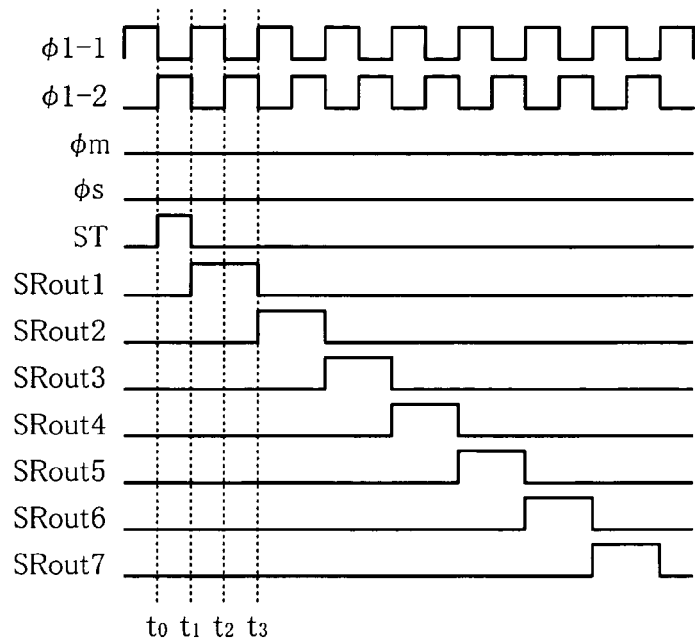
FIG. 9 is a timing chart for explaining operation in the case where sequential scanning is effected by the shift register shown in FIG. 8.

It should be noted that, although construction and timing thereof for stopping the shift register operation have not been explained in the description of the shift register and its operation shown in FIGS. 8 to 10, a known, so-called shift register with reset function can be used to stop the shift register at an optional location by stopping transmission of output signal to the subunit of a next stage from the shift register unit at the location where stop is to be made. Accordingly, an optional region of the pixel section 11 can be read out with using the shift register shown in FIG. 8 at each scanning circuit of the solid-state imaging apparatus.

An operation will now be described of the case where read operation of an optional region in row direction and reset operation of unread pixel cells are effected in a combination in the solid-state imaging apparatus according to the present embodiment. FIG. 11 typically indicates each pixel region when an optional region is read out, wherein: 70 is an effective pixel region; 71 is a read region to be read out through read operation of the optional region; and 72 and 73 are first and second reset regions where reset operation of the pixel cells is effected within regions which are not read out.

Figure 12:
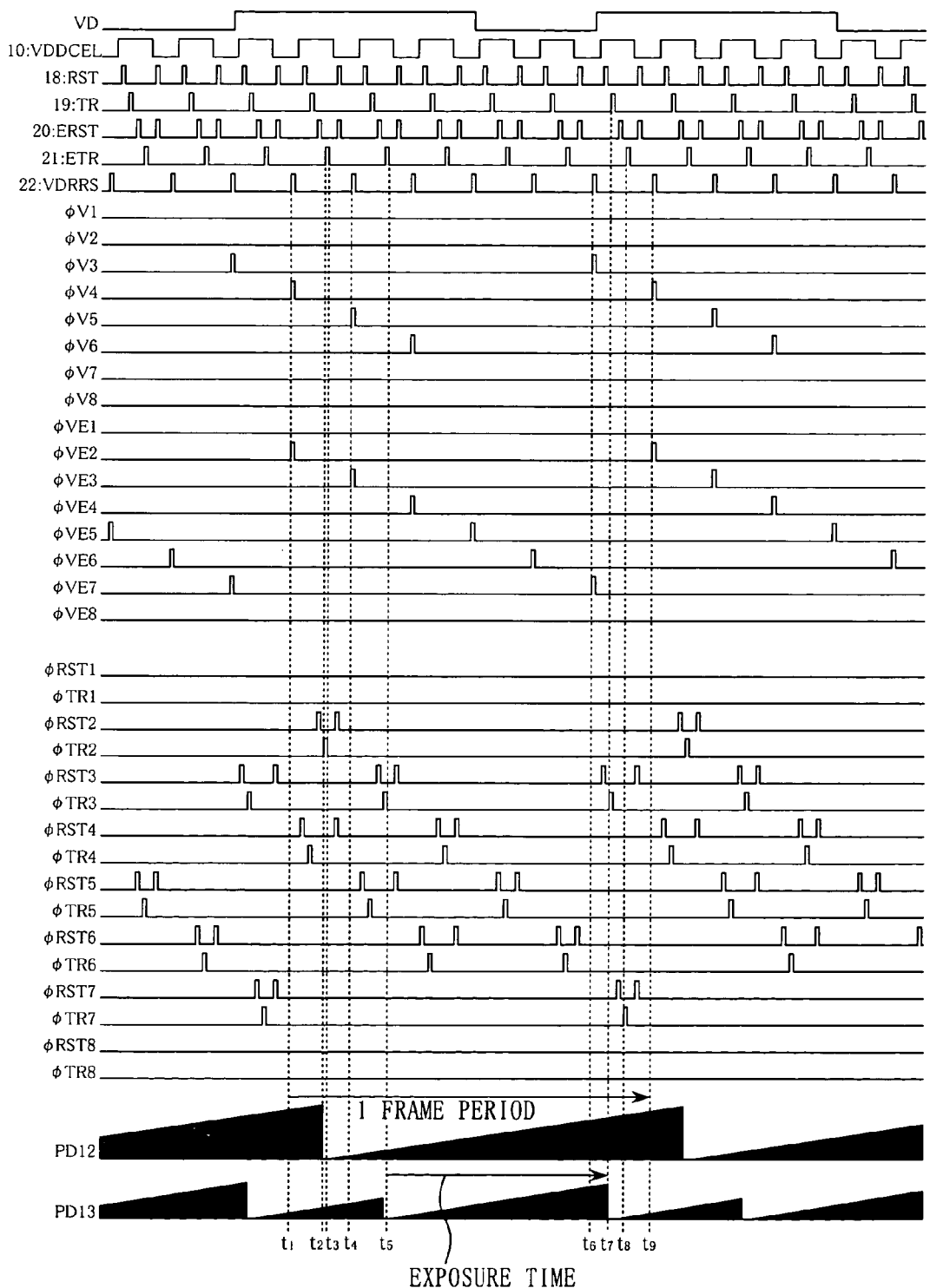
FIG. 12 is a timing chart for explaining operation when an optional region shown in FIG. 11 is read out.

A description will now be given by way of a timing chart of FIG. 12 of a regional read operation when the third to sixth rows are set as the read region 71, the second row as the first reset region 72, and the seventh row as the second reset region 73. Shown in FIG. 12 are the respective waveforms of: VD (vertical synchronizing signal); VDDCEL (power supply line 10 of pixel cell); RST (read reset pulse line 18); TR (read transfer pulse line 19); ERST (electronic shutter reset pulse line 20); ETR (electronic shutter transfer pulse line 21); VDRRS (scanning circuit output fetching pulse line 22); φV1 to φV8 (read row select line); φVE1 to φVE8 (electronic shutter row select line); φRST1 to φRST8 (pixel reset pulse line of each row); and φTR1 to φTR8 (pixel transfer pulse line of each row). Also in FIG. 12, PD12, PD13 represent electric potentials of photodiodes PD12, PD13 of the pixel cells PIX12 and PIX13, respectively, of the solid-state imaging device shown in FIG. 4.

When, at time $t_1$, the electronic shutter row select line φVE2 is driven to "H" level by the electronic shutter scanning circuit 13, "H" level is retained at a predetermined capacitor of the second stage of the multiplexer 14 in accordance with what has been described in the above. Subsequently, FD section 44 of the pixel cells of the second row is set to the same "H" level as the power supply line VDDCEL by operation of the multiplexer 14, and when the pixel transfer pulse line φTR2 becomes "H" level at time $t_2$, charge accumulated at photodiode of the pixel cells of the second row is transferred to FD section 44. The electric charge at photodiode of the pixel cells of the second row is thereby cleared so that reset operation of these pixel cells is complete (time $t_3$). When the electronic shutter row select line φVE3 becomes "H" level at time $t_4$ by operation of the electronic shutter scanning circuit 13, similar reset operation is effected this time of the pixel cells of the third row. Here, at the pixel cells of the third row which is a row to be read out, time $t_5$ (at timing point when pixel transfer pulse line φTR3 is switched from "H" level to "L" level) corresponds to the timing at which exposure is started. Thereafter, similar reset operation is effected of the pixel cells of the fourth row, fifth row, etc.

At following time $t_6$, at the same time when the electronic shutter row select line φVE7 is driven to "H" level by the electronic shutter scanning circuit 13, the read row select line φV3 is driven to "H" level by the vertical scanning circuit 12. When the pixel transfer pulse line φTR3 is thus driven to "H" level by the multiplexer 14 at time $t_7$, transfer of electric charge at the pixel cells of the third row is effected to read the electric charge of the pixel cells of the third row. Further, when the pixel transfer pulse line φTR7 is driven to "H" level by the multiplexer 14 at time $t_8$, reset operation of the pixel cells of the seventh row is effected.

At and after time $t_9$, the electronic shutter row select line φVE2 is driven to "H" level again by the electronic shutter scanning circuit 13 to effect reset operation of the pixel cells of the second row, and the read row select line φV4 is driven to "H" level by the vertical scanning circuit 12 to effect electric charge read operation of the pixel cells of the fourth row. In this manner, reset operation of the second to seventh rows and read operation of the third to sixth rows are repeated.

As the above, since the electronic shutter scanning circuit 13 scans the first reset region 72, read region 71, and second reset region 73 in every one frame period, the electronic shutter operation and the reset operation of unread pixel rows can be effected in a combination. Accordingly, since reset operation of the unread pixel rows (first and second reset regions 72, 73) adjacent to the read region 71 is effected in every one frame period, attainment of saturation of the electric charge accumulated at photodiode of the unread pixel cells can be inhibited so that an occurrence of spurious signal onto the pixel cell to be read can be prevented.

With the above operation, a high quality image without smear, blooming or color mixture can be obtained. Further the above first embodiment has been described by way of an example of but is not limited to the case where the two reset regions 72 and 73 each correspond to one pixel row. The present embodiment is naturally also applicable to cases where the two reset regions each are composed of a plurality of pixel rows according to use.

Second Embodiment

Figure 13:
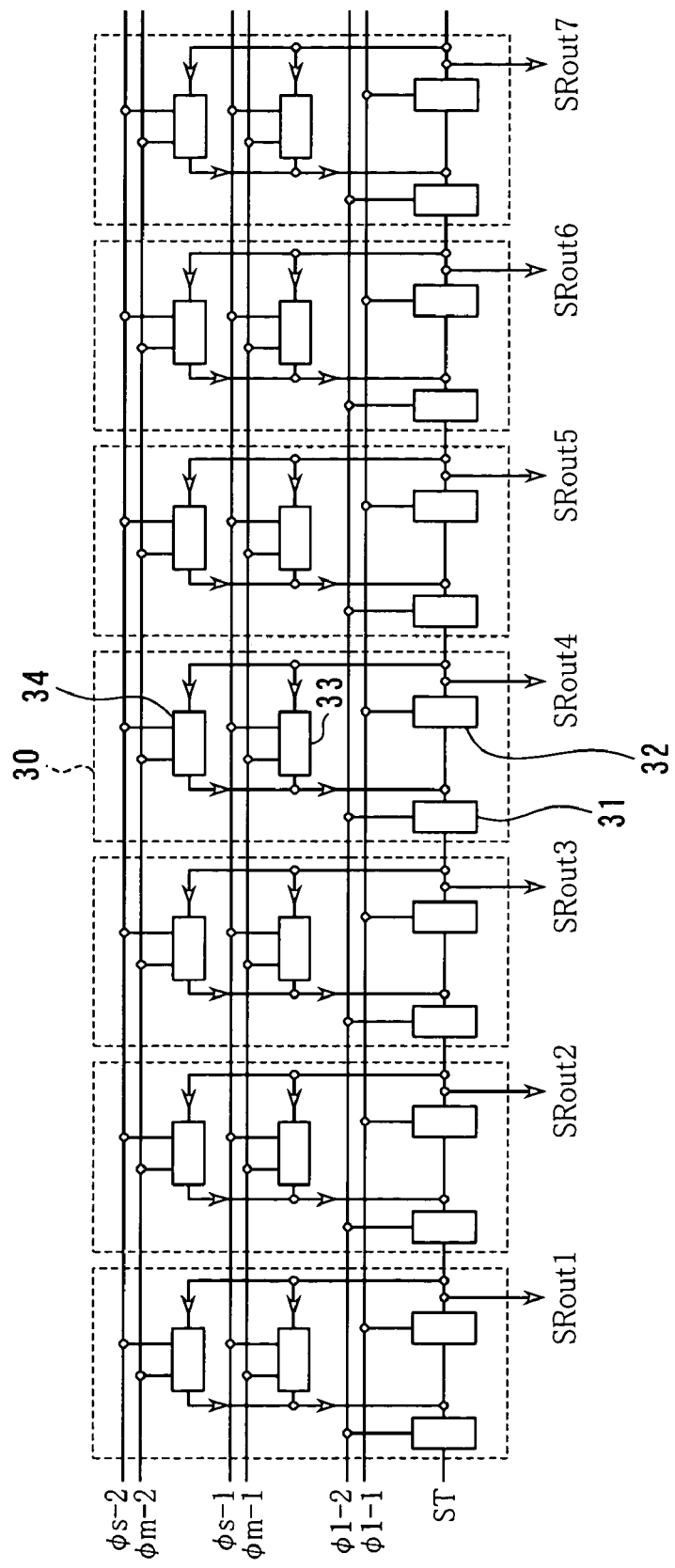
FIG. 13 is a block diagram showing an example of construction of the shift register of electronic shutter scanning circuit in the solid-state imaging apparatus according to a second embodiment of the invention.

A second embodiment of the invention will now be described. The fundamental construction of the solid-state imaging apparatus and the solid-state imaging device thereof according to the second embodiment is similar to the first embodiment shown in FIGS. 3 and 4. In the second embodiment, construction of the electronic shutter scanning circuit 13 is different from that of the solid-state imaging device 2 according to the first embodiment shown in FIG. 4. Its construction is shown in FIG. 13. Referring to FIG. 13, a shift register unit 30 corresponding to one stage includes a first and second subunits 31, 32, and first and second storage sections 33, 34. An output end of the shift register unit 30 is connected to the input ends of the first and second storage sections 33, 34, and is also connected to an input end of the shift register unit 30 of the next stage. Further, the output ends of the first and second storage sections 33, 34 are connected to an input end of the second subunit 32. The first and second subunits 31, 32 are driven by drive pulses φ1-2, φ1-1, respectively. On the other hand, the first and second storage sections 33, 34 have a function for storing signals respectively by control pulses φm-1, φm-2, and each have a function for reading signals respectively by control pulses φs-1, φs-2.

It is to be noted that, in the following description, numerals in parenthesis are used so that each shift register unit, each subunit, and each storage section are distinguished from the others as to which one of the stages in order the shift register unit, subunit and storage section respectively belong to. For example, those belonging to the first stage will be represented by "shift register unit 30(1), subunits 31(1), 32(1), storage sections 33(1), 34(1)".

Figure 14:
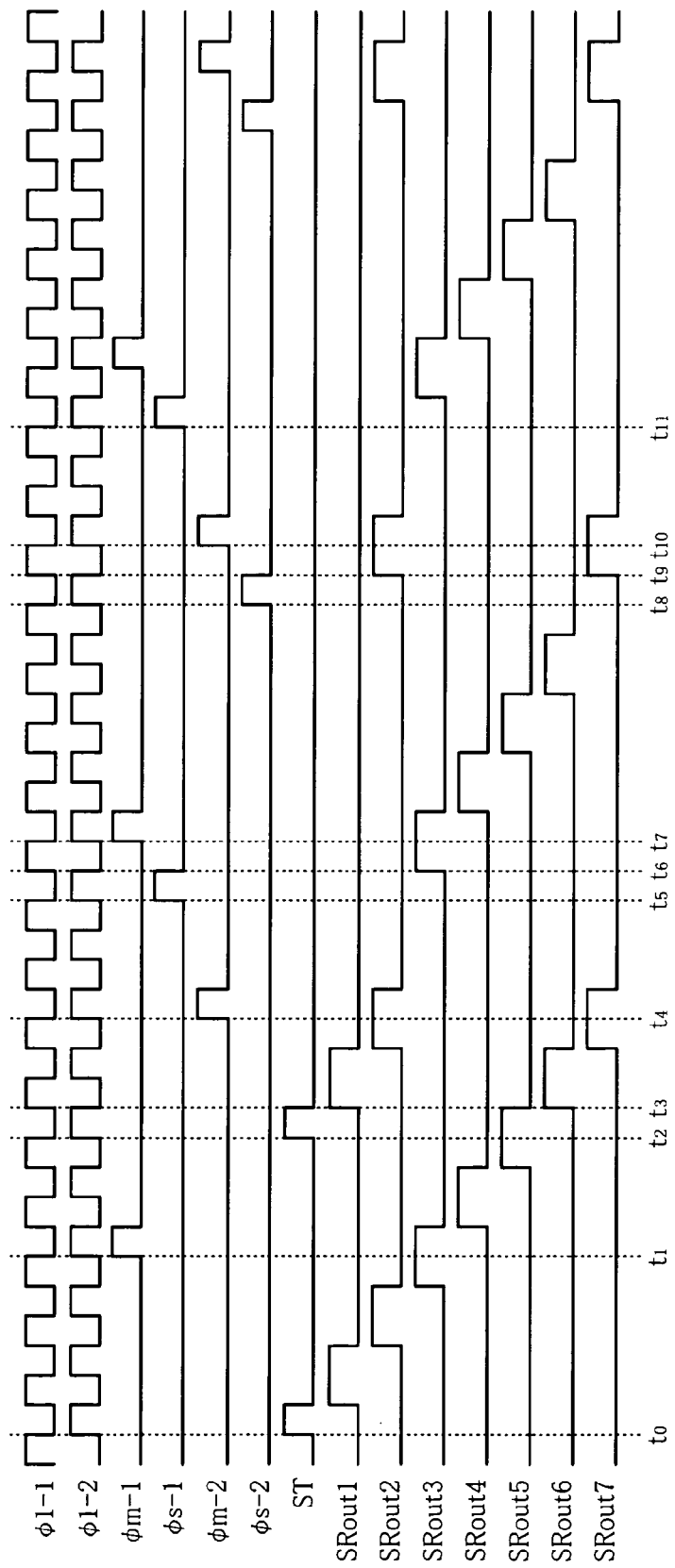
FIG. 14 is a timing chart for explaining operation in the case where a plurality of signals are simultaneously outputted by the shift register in effecting windowing scanning at the shift register shown in FIG. 13.

An operation in the case where the shift register shown in FIG. 13 effects sequential scanning and windowing scanning of a predetermined region is identical to the description of operation in the first embodiment given in the above by way of the timing charts shown in FIGS. 9 and 10. In the second embodiment, the shift register is made also capable of simultaneously outputting a plurality of signals in effecting cutout scanning of a predetermined region. An operation of such case will be described by way of a timing chart of FIG. 14. Referring to FIG. 14, when input pulse ST is applied to the first-stage shift register unit 30(1) at time $t_0$, the input signal ST is sequentially transmitted at timings where drive pulses φ1-2 and φ1-1 become "H" level so that sequential scanning is effected. When control pulse φm-1 becomes "H" level at time $t_1$, the output level of each shift register unit at that time is stored to each first storage section 33. Here, since output SRout3 of the third-stage shift register unit 30(3) is "H" level, "H" level is stored only to the third-stage first storage section 33(3) and "L" level is stored to the first storage section 33 of the other stages.

Next, when input signal ST is applied again at time $t_2$ where output SRout5 of the fifth-stage shift register unit 30(5) is at "H" level, outputs SRout1, SRout6 of the first- and sixth-stage shift register units 30(1) and 30(6) become "H" level at following time $t_3$. Further, when control pulse φm-2 becomes "H" level at time $t_4$ where outputs SRout2, SRout7 of the second- and seventh-stage shift register units 30(2) and 30(7) are "H" level, "H" level is stored to the second- and seventh-stage second storage sections 34(2) and 34(7) in accordance with the output level of each shift register unit.

Next, when control pulse φs-1 becomes "H" level at time $t_5$ where the outputs of all the shift register units are "L" level, signal levels retained at each first storage section 33 are read out. At this time, since "H" level is read out from the third-stage first storage section 33(3), output SRout3 of the third-stage shift register unit 30(3) becomes "H" level at time $t_6$. When control pulse φm-1 becomes "H" level at following time $t_7$, "H" level is stored again to the third-stage first storage section 33(3). Thereafter, signal is sequentially transmitted at timings where drive pulses φ1-1, φ1-2 become "H" level, whereby the shift register effects a windowing scanning started from the third stage.

Next, when control pulse φs-2 becomes "H" level at time $t_8$, signal levels retained at each second storage section 34 are read out. At this time, since "H" level is read out from the second- and seventh-stage second storage sections 34(2) and 34(7), outputs SRout2, SRout7 of the second- and seventh-stage shift register units 30(2) and 30(7) become "H" level at time $t_9$. When control pulse φm-2 becomes "H" level at following time $t_{10}$, "H" level is stored again to the second- and seventh-stage second storage section 34(2) and 34(7). Next, when control pulse φs-1 becomes "H" level again at time $t_{11}$, output SRout3 of the third-stage shift register unit 30(3) similarly becomes "H" level so that signal is sequentially transmitted. In this manner, scanning can be started from an optional location by means of control of the control pulses φm-1, φm-2, φs-1, φs-2. Further, a plurality of signals can be simultaneously outputted from the shift register based on timing at which input signal ST is applied.

It should be noted that, although construction and timing for stopping shift register operation have not been set forth in the description of the shift register and its operation shown in FIGS. 13 and 14, a known, so-called shift register with reset function can be used to stop the shift register at an optional location by stopping transmission of output signal to the shift register unit of a next stage from the shift register unit at the location where stop is to be made. Accordingly, an optional region of the pixel section 11 can be read out by using the shift register shown in FIG. 13 at each scanning circuit of the solid-state imaging device.

Figure 15:
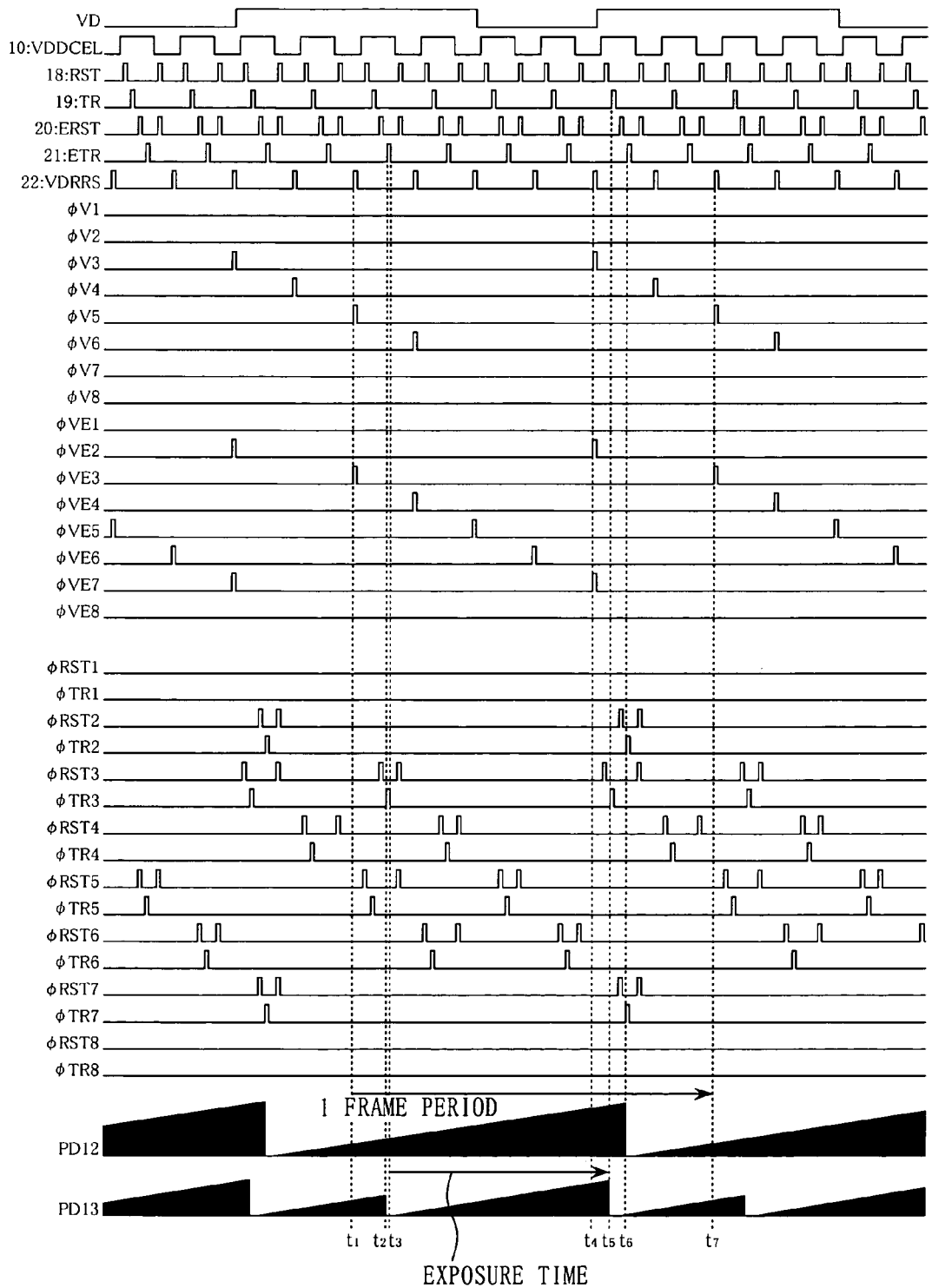
FIG. 15 is a timing chart for explaining operation in the case where read operation of an optional region and reset operation of unread pixel cells are effected in a combination along a row direction at the shift register shown in FIG. 13.

An operation will now be described by way of a timing chart shown in FIG. 15 of the case where read operation of an optional region in row direction and reset operation of unread pixels are effected in a combination at the solid-state imaging apparatus according to the present embodiment. FIG. 15 shows operation at the time of regional readout in the case where the third to sixth rows are set as the read region 71 of FIG. 11, the second row as the first reset region 72, and the seventh row as the second reset region 73, indicating the waveforms of: VD (vertical synchronizing signal); VDDCEL (power supply line 10 of pixel cell); RST (read reset pulse line 18); TR (read transfer pulse line 19); ERST (electronic shutter reset pulse line 20); ETR (electronic shutter transfer pulse line 21); VDRRS (scanning circuit output fetching pulse line 22); φV1 to φV8 (read row select line); φVE1 to φVE8 (electronic shutter row select line); φRST1 to φRST8 (pixel reset pulse line of each row); and φTR1 to φTR8 (pixel transfer pulse line of each row). Further, PD12, PD13 represent electric potentials of photodiodes PD12, PD13 of the pixel cells PIX12 and PIX13, respectively, of the solid-state imaging device shown in FIG. 4.

After the electronic shutter row select line φVE3 is driven to "H" level by the electronic shutter scanning circuit 13 at time $t_1$, when the pixel transfer pulse line φTR3 is driven to "H" level by the multiplexer 14 at following time $t_2$, reset operation of the pixel cells of the third row is performed (time $t_3$). Thereafter, reset operation of the read region 71 is effected in accordance with operation of the electronic shutter scanning circuit 13 and multiplexer 14, whereby start timing of exposure of each pixel row is determined.

Next the read row select line φV3 is driven to "H" level by the vertical scanning circuit 12 at time $t_4$, and the pixel transfer pulse line φTR3 becomes "H" level at following time $t_5$ to effect read operation of the third pixel row. It should be noted that, concurrently at time $t_4$, the electronic shutter row select lines φVE2 and φVE7 are driven to "H" level by the electronic shutter scanning circuit 13, and, at following time $t_6$, reset operation of the pixel cells of the second and seventh rows, which are the first and second reset regions 72 and 73, is effected by operation of the multiplexer 14. Thereafter, read operation of the third to seventh rows, which is the read region 71, is effected in accordance with operation of the vertical scanning circuit 12 and the multiplexer 14, and when time $t_7$ is reached, an electronic shutter operation of the read region 71 is effected again by the electronic shutter scanning circuit 13.

As the above, the electronic shutter scanning circuit 13 scans the first reset region 72, the read region 71, and the second reset region 73 in every one frame period so that the electronic shutter operation and the reset operation of unread pixel rows can be effected in a combination. Accordingly, since reset operation of the unread pixel rows (first and second reset regions 72, 73) adjacent to the read region 71 is effected in every one frame period, an attainment of saturation of electric charge accumulated at photodiode of unread pixel cells can be inhibited to thereby prevent an occurrence of spurious signal onto the pixel cells to be read. In the above embodiment, since reset operations of the first and second reset regions 72 and 73 can be simultaneously effected, one frame period can be made shorter as compared to the method shown in the first embodiment so that readout of an optional region at higher speed is possible.

With the above operation, a high quality image without smear, blooming or color mixture can be obtained. Further the above second embodiment has been described by way of an example of but is not limited to the case where the first and second reset regions 72 and 73 each correspond to one pixel row. The present embodiment is naturally also applicable to cases where the two reset regions each are composed of a plurality of pixel rows according to use.

Third Embodiment

Figure 16:
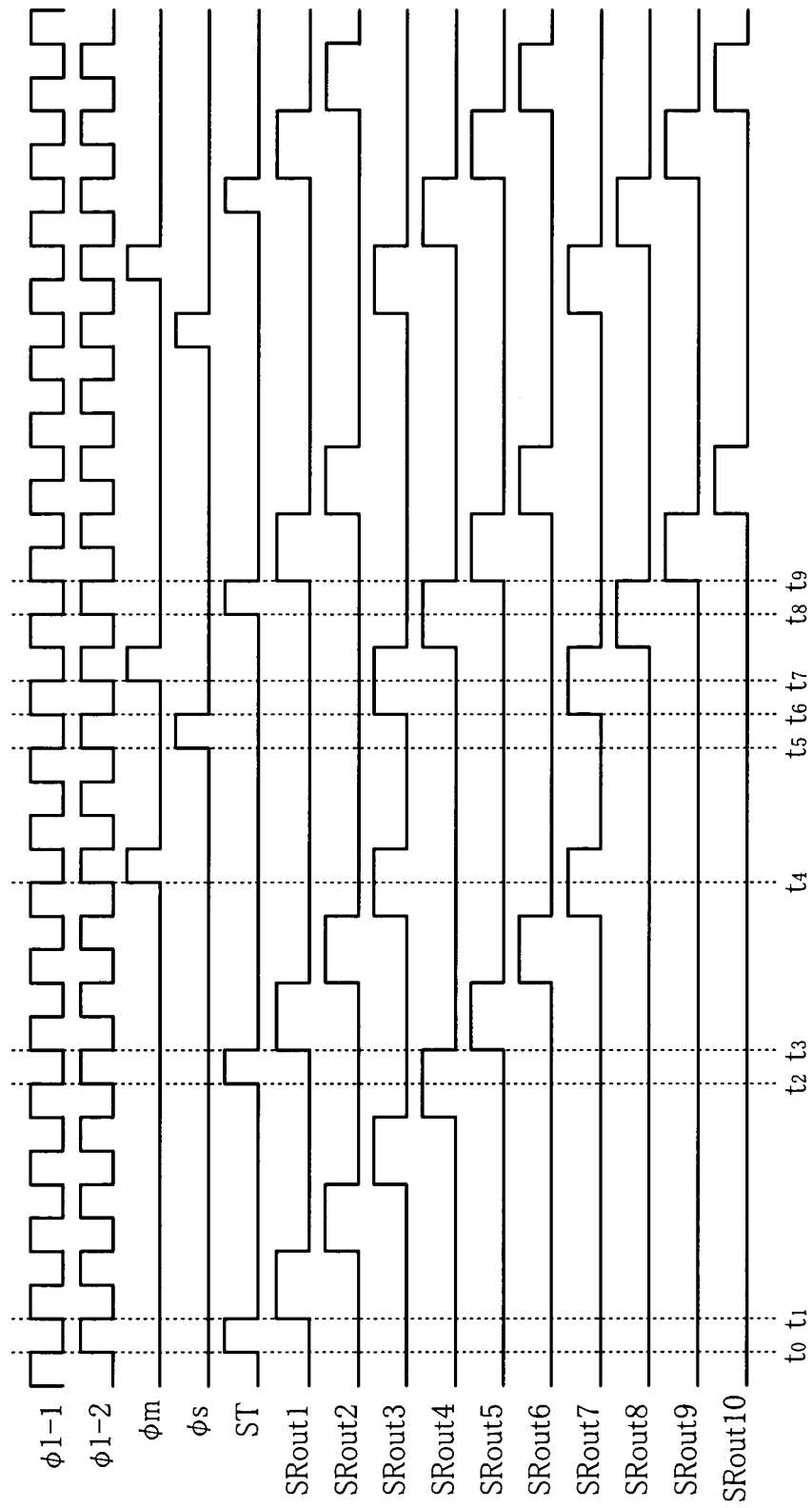
FIG. 16 is a timing chart for explaining operation where the shift register used in the electronic shutter scanning circuit simultaneously outputs a plurality of signals while effecting cutout scanning in the solid-state imaging apparatus according to a third embodiment of the invention.

A third embodiment of the invention will now be described. In this embodiment, the shift register in the first embodiment shown in FIG. 8 is constructed so that it can simultaneously output a plurality of signals while effecting windowing scanning of a predetermined region. FIG. 16 is a timing chart showing operation of the shift register according to the third embodiment where such operation is effected. Referring to FIG. 16, when input signal ST is applied to the first-stage shift register unit 30(1) at time $t_0$, output SRout1 of the first-stage shift register unit 30(1) becomes "H" level at time $t_1$ where drive pulse φ1-1 becomes "H" level. Subsequently, the input signal ST is sequentially transmitted at timings where drive pulses φ1-2 and φ1-1 become "H" level so that sequential scanning is effected. When input signal ST is applied again to the first-stage shift register unit 30(1) at time $t_2$, outputs SRout1, SRout5 of the first- and fifth-stage shift register units 30(1) and 30(5) become "H" level at time $t_3$. Thereafter, the shift register effects transmission of two signals so that two "H" levels are simultaneously outputted to the outputs of the shift register. At following time $t_4$, when control pulse φm becomes "H" level, the output level of each shift register unit at that time is stored to each storage section 33. In this case, since outputs SRout3 and SRout7 of the third and seventh stages are at "H" level, "H" level is stored only to the third- and seventh-stage storage sections 33(3), 33(7), and "L" level is stored to the storage sections 33 of the other stages.

Next, when control pulse φs becomes "H" level at time $t_5$, the signal levels retained at each storage section 33 are read out. At this time, since "H" level is read out from the third- and seventh-stage storage sections 33(3), 33(7), outputs SRout3, SRout7 of the third- and seventh-stage shift register units 30(3) and 30(7) become "H" level at time $t_6$. At following time $t_7$, when control pulse φm becomes "H" level, "H" level is stored again to the third- and seventh-stage storage sections 33(3), 33(7). Further, when input signal ST is applied to the first-stage shift register unit 30(1) at time $t_8$, outputs SRout1, SRout5, SRout9 of the shift register units 30(1), 30(5), 30(9) of the first, fifth, and ninth stages becomes "H" level at time $t_9$. Thereafter, the shift register effects transmission of three signals so that three "H" levels are simultaneously outputted to the outputs of the shift register.

In this manner, scanning can be started from an optional location by means of control of the control pulses φm, φs. Further, a plurality of signals can be simultaneously outputted from the shift register based on timing at which input signal ST is applied. It should be noted that, although construction and timing for stopping shift register operation have not been set forth in the description of the shift register and its operation shown in FIGS. 8 and 16, the shift register can be stopped similarly at an optional location with using a known, so-called shift register with reset function. Accordingly, an optional region of the pixel section 11 can be read out by using the shift register shown in FIG. 8 at each scanning circuit of the solid-state imaging device.

Figure 17:
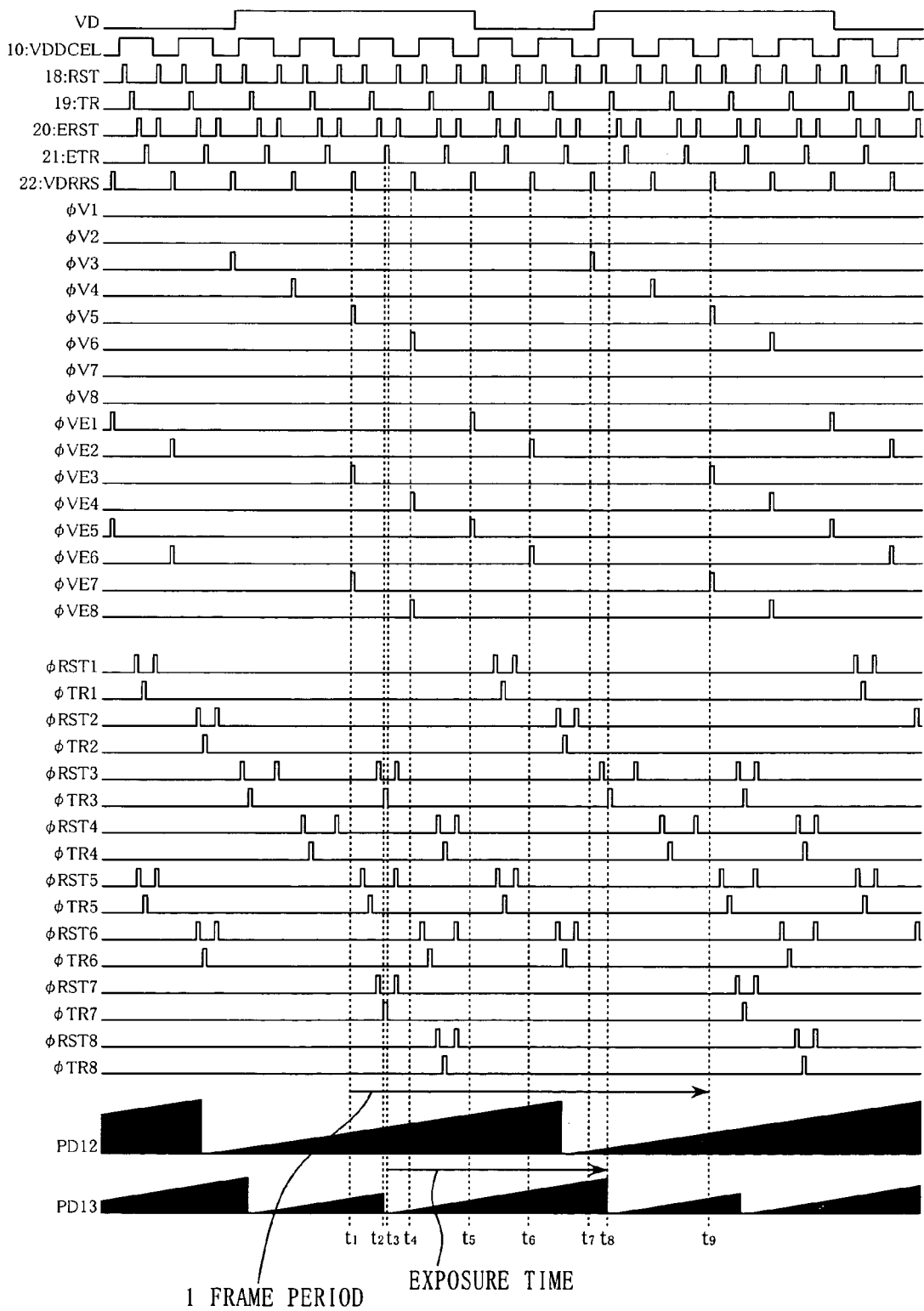
FIG. 17 is a timing chart for explaining operation in the case where read operation of an optional region and reset operation of unread pixel cells along the row direction are effected in a combination at the shift register for performing the operation shown in the timing chart of FIG. 16.

An operation will now be described by way of a timing chart shown in FIG. 17 of the case where read operation of an optional region in row direction and reset operation of unread pixels are effected in a combination by the solid-state imaging apparatus according to the present embodiment. FIG. 17 shows operation at the time of regional readout in the case where the third to sixth rows are set as the read region 71 of FIG. 11, the first and second rows as the first reset region 72, and the seventh and eighth rows as the second reset region 73, indicating the waveforms of: VD (vertical synchronizing signal); VDDCEL (power supply line 10 of pixel cell); RST (read reset pulse line 18); TR (read transfer pulse line 19); ERST (electronic shutter reset pulse line 20); ETR (electronic shutter transfer pulse line 21); VDRRS (scanning circuit output fetching pulse line 22); φV1 to φV8 (read row select line); φVE1 to φVE8 (electronic shutter row select line); φRST1 to φRST8 (pixel reset pulse line of each row); and φTR1 to φTR8 (pixel transfer pulse line of each row). Further, PD12, PD13 represent electric potentials of photodiodes PD12, PD13 of the pixel cells PIX12 and PIX13, respectively, of the solid-state imaging device shown in FIG. 4.

After the electronic shutter row select lines φVE3, φVE7 are driven to "H" level by the electronic shutter scanning circuit 13 at time $t_1$, when the pixel transfer pulse lines φTR3, φTR7 are driven to "H" level by the multiplexer 14 at following time $t_2$, reset operation of the pixel cells of the third and seventh rows is performed (time $t_3$). Further, the electronic shutter row select lines φVE4, φVE8 are driven to "H" level by the electronic shutter scanning circuit 13 at time $t_4$ so that reset operation of the pixel cells of the fourth and eighth rows is effected. At time $t_5$, the electronic shutter row select lines φVE1, φVE5 are driven to "H" level by the electronic shutter scanning circuit 13 so that reset operation of the pixel cells of the first and fifth rows is effected. At following time $t_6$, the electronic shutter row select lines φVE2, φVE6 become "H" level so that reset operation of the pixel cells of the second and sixth rows is effected.

Next the read row select line φV3 is driven to "H" level by the vertical scanning circuit 12 when time $t_7$ is reached, and, when the pixel transfer pulse line φTR3 is driven to "H" level by the multiplexer 14 at following time $t_8$, an electric charge read operation of the pixel cells of the third row is effected. Thereafter, read operation of the pixels of the third to sixth rows, i.e., the read region 71 is effected in accordance with operation of the vertical scanning circuit 12 and the multiplexer 14, and at the same time when time $t_9$ is reached, the electronic shutter operation of the read region 71 and reset operation of the reset regions 72, 73 are effected again by the electronic shutter scanning circuit 13.

As the above, the electronic shutter scanning circuit 13 scans the first reset region 72, the read region 71, and the second reset region 73 in every one frame period so that the electronic shutter operation and the reset operation of unread pixel rows can be effected in a combination. Accordingly, since reset operation of the unread pixel rows adjacent to the read region 71 is effected in every one frame period, an attainment of saturation of electric charge accumulated at photodiode of unread pixel cells can be inhibited so that it is possible to prevent an occurrence of spurious signal onto the pixel cells to be read. In the third embodiment, since reset operation of the reset regions 72 and 73 can be effected simultaneously with the electronic shutter operation, one frame period can be made shorter as compared to the methods shown in the first and second embodiments so that readout of an optional region at higher speed is possible.

With the above operation, a high quality image without smear, blooming and color mixture can be obtained. Further the above third embodiment has been described by way of an example of but is not limited to the case where the two, i.e., first and second reset regions 72 and 73 each correspond to two pixel rows. The present invention is naturally also applicable to cases where optional pixel rows are set as the two reset regions according to use.

In accordance with the present invention as has been described by way of the above embodiments, when an optional region is to be read, reset operation of the pixel cells of unread lines is also effected in a combination with the electronic shutter operation for determining exposure time of the pixel cells belonging to the lines to be read. For this reason, attainment of saturation of the electric charge accumulated at photodiode of the unread pixel cells can be inhibited to prevent an occurrence of spurious signal so that the solid-state imaging apparatus can be achieved as capable of obtaining a high quality image without smear, blooming and color mixture.

The advantages of the solid-state imaging apparatus according to each aspect are as follows.

With the solid-state imaging apparatus according to the first aspect, unread regions in the vicinity of the read region are also subject of selection by the second line select signal, and reset operation at timings corresponding to an exposure time is effected on the pixel cells belonging to the lines selected by the second line select signal. Thereby reset is effected also on the pixel cells belonging to the lines of unread region to inhibit an electric charge saturation of the pixel cells belonging to the lines of unread region so that an occurrence of spurious signal can be suppressed at the pixel cells belonging to the first lines in the vicinity of and especially those adjacent to the unread region.

With the solid-state imaging apparatus according to the second aspect, the read scanning circuit is provided with a first storage section for storing and outputting an output signal of the first subunit, and the electronic shutter scanning circuit is provided with a second storage section for storing and outputting an output signal of the second subunit, where control of such storing and outputting are effected by the scanning control section. It is thereby possible to optionally and repeatedly set a read start line of the electrical signals and a reset start line of unread region.

With the solid-state imaging apparatus according to the third aspect, transmission of output signal from the second subunit corresponding to an end line of unread region to the second subunit of the next stage is stopped. A reset operation only of unread region is thereby possible.

With the solid-state imaging apparatus according to the fourth aspect, a second line select signal is outputted simultaneously to a plurality of lines within an unread region in the vicinity of the region to be read. A simultaneous reset operation thereby becomes possible of a plurality of lines in the unread region in the vicinity of the read region so that an optional region can be read at higher speed by making one frame period shorter.

With the solid-state imaging apparatus according to the fifth aspect, a second line select signal is outputted simultaneously to one line within the region to be read and at least one line within an unread region. Thereby start of exposure of one line in the read region and reset operation of at least one line within the unread region can be simultaneously effected so that an optional region can be read at higher speed by making one frame period shorter.

With the solid-state imaging apparatus according to the sixth aspect, a mode switching section is further provided, and the scanning control section controls the line scanning circuit and the electronic shutter scanning circuit in accordance with a mode set by the mode switching section. Thereby setting between a first mode and a second mode is possible from an external section.

With the solid-state imaging apparatus according to the seventh aspect, a second control is executed when the second mode is set. Thereby, in the second mode, reset is effected also on the pixel cells belonging to the lines of an unread region to inhibit an electric charge saturation of the pixel cells belonging to the lines of the unread region so that an occurrence of spurious signal can be suppressed at the pixel cells belonging to the first lines in the vicinity of and especially those adjacent to the unread region.

With the solid-state imaging apparatus according to the eighth aspect, a second line select signal is outputted simultaneously to a plurality of lines within an unread region in the vicinity of the region to be read. A simultaneous reset operation thereby becomes possible of a plurality of lines in the unread region in the vicinity of the read region so that an optional region can be read at higher rate by making one frame period shorter.

With the solid-state imaging apparatus according to the ninth aspect, a second line select signal is outputted simultaneously to one line within the region to be read and at least one line within an unread region. Thereby start of exposure of one line in the read region and reset operation of at least one line within the unread region can be simultaneously effected so that an optional region be read at higher rate by making one frame period shorter.

What is claimed is:

1. A solid-state imaging apparatus comprising:
   a pixel section having a plurality of two-dimensionally disposed pixel cells each for effecting photoelectric conversion of an incident light, accumulating the incident light as an electric charge, and converting the electric charge into an electrical signal;
   a plurality of lines each connected in common to a number of pixel cells arranged in a row direction of the pixel section;
   a read scanning circuit for outputting to said pixel section a first line select signal for selecting first lines from which said electrical signals are read out;
   an electronic shutter scanning circuit for outputting to said pixel section a second line select signal for selecting second lines to which an operation setting corresponding to exposure time is effected; and
   a scanning control section for executing a first control for controlling selection of said first lines through said read scanning circuit in a read region consisting of a plurality of lines within said pixel section and a second control for controlling selection of said second lines through said electronic shutter scanning circuit with taking said read region and an unread region in the vicinity of said read region as subject of selection and controlling timing for resetting said pixel cells belonging to the second lines in accordance with said exposure time.

2. The solid-state imaging apparatus according to claim 1 further comprising a mode switching section for switching based on input from an external section to set a first mode where said electrical signals are acquired from an entire region of an effective pixel region of said pixel section or a second mode where said read region having an optional size is set within said effective pixel region to acquire said electrical signals from an entire region within said read region, wherein said scanning control section controls said read scanning circuit and said electronic shutter scanning circuit in accordance with said mode set by said mode switching section.

3. The solid-state imaging apparatus according to claim 2, wherein said scanning control section executes said second control when said second mode is set.

4. The solid-state imaging apparatus according to claim 3, wherein said scanning control section under said second control controls the electronic shutter scanning circuit so that said electronic shutter scanning circuit outputs said second line select signal simultaneously to a plurality of said lines within said unread region in the vicinity of said read region.

5. The solid-state imaging apparatus according to claim 3, wherein said scanning control section under said second control controls the electronic shutter scanning circuit so that said electronic shutter scanning circuit outputs said second line select signal simultaneously to one line within said read region and to at least one line within said unread region.

6. A solid-state imaging apparatus comprising:
a pixel section having a plurality of two-dimensionally disposed pixel cells each for effecting photoelectric conversion of an incident light, accumulating the incident light as an electric charge, and converting the electric charge into an electrical signal;
a plurality of lines each connected in common to a number of pixel cells arranged in a row direction of the pixel section;
a read scanning circuit for outputting to said pixel section a first line select signal for selecting first lines from which said electrical signals are read out;
an electronic shutter scanning circuit for outputting to said pixel section a second line select signal for selecting second lines to which an operation setting corresponding to exposure time is effected; and
a scanning control section for executing a first control for controlling selection of said first lines through said read scanning circuit in a read region consisting of a plurality of lines within said pixel section and a second control for controlling selection of said second lines through said electronic shutter scanning circuit with taking said read region and an unread region in the vicinity of said read region as subject of selection and controlling timing for resetting said pixel cells belonging to the second lines in accordance with said exposure time, wherein said read scanning circuit includes a plurality of stages of first shift register units connected in cascade, said first shift register unit comprising:
a first subunit for transmitting output signal from said first shift register unit of a previous stage to said first shift register unit of a next stage and outputting said first line select signal based on output signal from the first shift register unit of said previous stage, and
a first storage section for storing the output signal of the first subunit and outputting the output signal of the first subunit to said first subunit;
wherein said electronic shutter scanning circuit includes a plurality of stages of second shift register units connected in cascade, said second shift register unit comprising:
a second subunit for transmitting output signal from said second shift register unit of a previous stage to said second shift register unit of a next stage and outputting said second line select signal based on output signal from the second shift register unit of said previous stage, and
a second storage section for storing the output signal of the second subunit and outputting the output signal of the second subunit to said second subunit;
wherein said scanning control section under said first control causes said first storage section to store output signal of said first subunit corresponding to a start line of said read region and sets said stored output signal to said first subunit when starting read, and also causes to stop transmission of output signal from said first subunit corresponding to an end line of said read region to said first subunit of the next stage, while under said second control causes said second storage section to store output signal of said second subunit corresponding to a start line in said unread region and sets said stored output signal to said second subunit in accordance with said exposure time.

7. The solid-state imaging apparatus according to claim 6, wherein said scanning control section causes to stop transmission of output signal from said second subunit corresponding to an end line of said unread region to said second subunit of the next stage.

8. The solid-state imaging apparatus according to claim 6, wherein said scanning control section under said second control controls the electronic shutter scanning circuit so that said electronic shutter scanning circuit outputs said second line select signal simultaneously to a plurality of said lines within the unread region in the vicinity of said read region.

9. The solid-state imaging apparatus according to claim 6, wherein said scanning control section under said second control controls the electronic shutter scanning circuit so that said electronic shutter scanning circuit outputs said second line select signal simultaneously to one line within said read region and to at least one line within said unread region.

\* \* \* \* \*